(12) United States Patent
Merkert et al.

(10) Patent No.: US 12,555,729 B2
(45) Date of Patent: Feb. 17, 2026

(54) GAS MONITORING SYSTEM AND RESPECTIVE METHOD

(71) Applicant: Hitachi Energy Ltd, Zürich (CH)

(72) Inventors: Lennart Merkert, Heidelberg (DE); Tim Schulze-Koenig, Heidelberg (DE); Huiry-Yuan Zhou, Beijing (CN); MinZhong Yang, Beijing (CN)

(73) Assignee: Hitachi Energy Ltd, Zürich (CH)

( * ) Notice: Subject to any disclaimer, the term of this patent is extended or adjusted under 35 U.S.C. 154(b) by 280 days.

(21) Appl. No.: 18/288,666

(22) PCT Filed: Apr. 22, 2022

(86) PCT No.: PCT/EP2022/060777
§ 371 (c)(1),
(2) Date: Oct. 27, 2023

(87) PCT Pub. No.: WO2022/229035
PCT Pub. Date: Nov. 3, 2022

(65) Prior Publication Data
US 2024/0222051 A1  Jul. 4, 2024

(30) Foreign Application Priority Data
Apr. 30, 2021 (EP) .................................... 21171459

(51) Int. Cl.
*H01H 33/56* (2006.01)
*H01H 11/00* (2006.01)
*H02B 13/065* (2006.01)

(52) U.S. Cl.
CPC ...... *H01H 33/563* (2013.01); *H01H 11/0062* (2013.01); *H02B 13/0655* (2013.01)

(58) Field of Classification Search
CPC ............. H01H 33/563; H01H 11/0062; H02B 13/0655
See application file for complete search history.

(56) References Cited

U.S. PATENT DOCUMENTS 6,125,692 A * 10/2000 Marmonier .......... H01H 33/563
73/30.01
2013/0031958 A1* 2/2013 Scheucher ............. G01M 3/26
73/31.05

(Continued)

FOREIGN PATENT DOCUMENTS

CN 103645014 A * 3/2014
EP 3621096 A1 3/2020

(Continued)

OTHER PUBLICATIONS

Extended European Search Report dated Oct. 18, 2021 for European Patent Application No. 21171459.7, 7 pages.

(Continued)

*Primary Examiner* — Francis C Gray
(74) *Attorney, Agent, or Firm* — Sage Patent Group

(57) ABSTRACT

A gas monitoring system includes
a gas-insulated switchgear including a chamber filled with an insulating gas surrounding a high or medium voltage component,
a sensor operatively connected to the chamber and adapted to measure a physical property of the insulating gas in the chamber over time, and
a computer unit adapted to perform on the sensor measurements a statistical step detection for determining if a jump has occurred and/or a statistical change detection for determining if a change has occurred, whereby the statistical step and/or change detection includes identifying an expected range based on past sensor measurements and checking if a current sensor measurement is outside of the expected range.

20 Claims, 1 Drawing Sheet

(56) References Cited

U.S. PATENT DOCUMENTS

2015/0355049 A1\* 12/2015 Ait Abdelmalek ... G01M 3/002
702/45
2017/0030799 A1\* 2/2017 Inami ................. H02B 13/0655
2021/0341529 A1\* 11/2021 Coapes .............. G01R 31/3275

FOREIGN PATENT DOCUMENTS

| EP | 3790032 A1 | 3/2021 |
|---|---|---|
| FR | 3001345 A1 | 7/2014 |
| JP | 2001186613 A | 7/2001 |
| JP | 2016095751 A | 5/2016 |
| JP | 2019193463 A | 10/2019 |

OTHER PUBLICATIONS

International Search Report and Written Opinion of the International Searching Authority, PCT/EP2022/060777, mailed Jul. 26, 2022, 13 pages.

Stoodley, K.D.C. et al., "The automatic Detection of Transients, Step Changes and Slope Changes in the Monitoring of Medical Time Series," Journal of the Royal Statistical Society. Series D (The Statistician), vol. 28, No. 3, 1979), 9 pages.

Wikipedia, "Step Detection," accessed on Dec. 11, 2020 from the Internet at: https://en.wikipedia.org/w/index.php?title=Step_detection&oldid=993652000, 3 pages.

Wikipedia, "Change Detection," accessed on Dec. 14, 2020 from the Internet at: https://en.wikipedia.org/w/index.php?title=Change_detection&oldid=994139474, 4 pages.

Notice of Reasons for Refusal, Japanese Patent Application No. 2023-566862, mailed Nov. 13, 2025, 9 pages.

\* cited by examiner

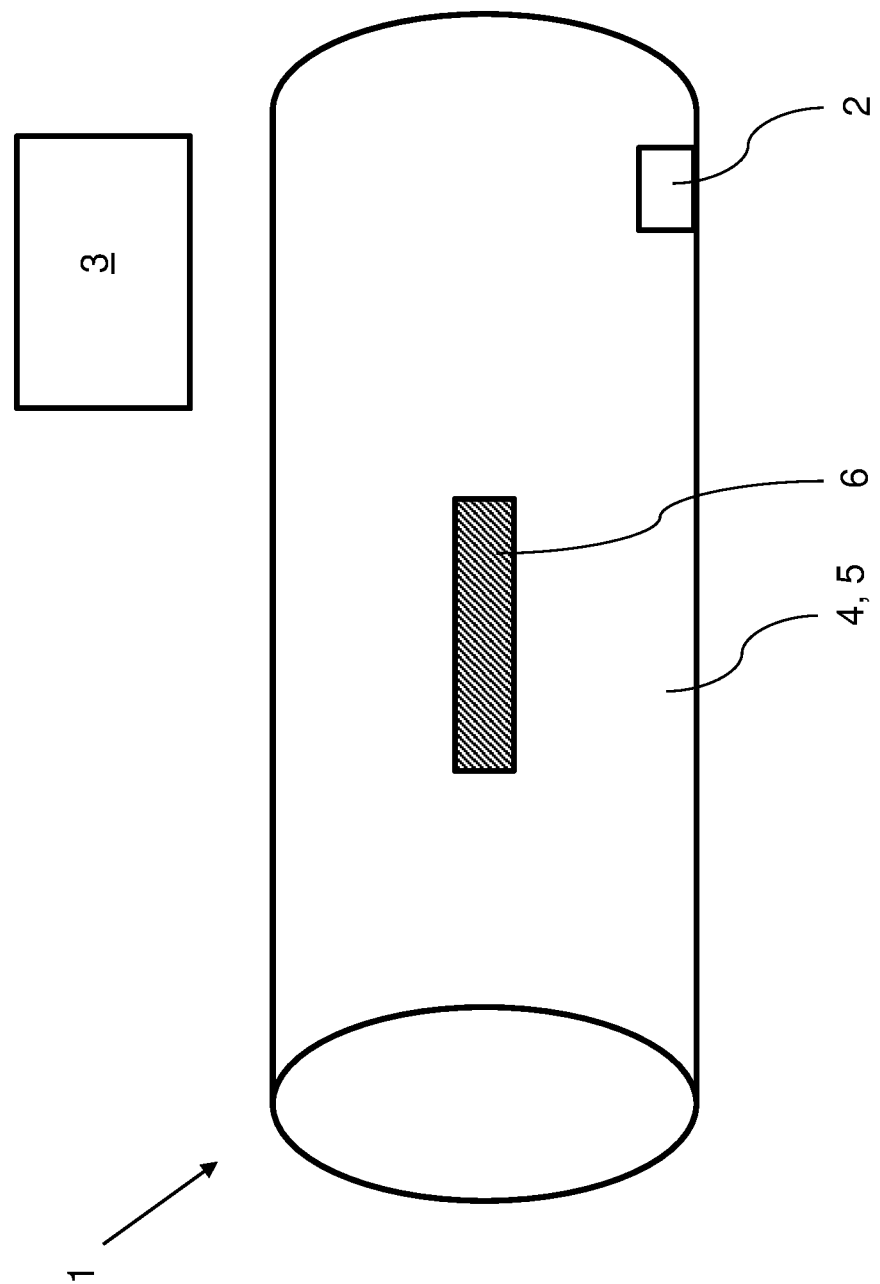

GAS MONITORING SYSTEM AND RESPECTIVE METHOD

CROSS REFERENCE TO RELATED APPLICATIONS

This application is a 35 U.S.C. § 371 national stage application of PCT Inter-national Application No. PCT/EP2022/060777 filed on Apr. 22, 2022, which in turn claims foreign priority to European Patent Application No. 21171459.7, filed on Apr. 30, 2021, the disclosures and content of which are incorporated by reference herein in their entirety.

TECHNICAL FIELD

The disclosure relates to a gas monitoring system comprising a gas-insulated switchgear comprising a chamber filled with an insulating gas surrounding a high or medium voltage component and a sensor operatively connected to the chamber and adapted to measure a physical property of the insulating gas in the respective chamber over time. The disclosure further relates to a respective method for a gas-insulated switchgear comprising a chamber filled with an insulating gas surrounding a high or medium voltage component, comprising the step of measuring a physical property of the insulating gas in the respective chamber over time.

BACKGROUND ART

Gas-insulated switchgear, GIS, is typically operated in a medium voltage regime of 10 kV to 100 kV and/or in a high voltage regime of 100 KV to 1200 kV. To insulate a high or medium voltage component, such as for example a disconnect switch, a fuse and/or a circuit breaker, the GIS is filled with an insulating gas such as air or SF6. Other gases are also used and currently under development by different manufacturers. However, SF6 traditionally has been the gas of choice for high voltage applications due to various advantages. The symmetrical arrangement of molecule leads to extreme stability and a very high dielectric capability. SF6 has thus approximately three times a dielectric strength of air at atmospheric pressure. As a result, a GIS using SF6 as an insulating gas can be considerably more compact than equipment using air as the insulating medium. Further, SF6 is a "self-healing" dielectric in that it is largely undamaged by breakdown. This makes SF6 highly suitable as an inter-rupting medium.

On the other side, SF6 is also recognized as a very potent greenhouse gas. The US EPA reports that SF6 has an atmospheric lifetime of around 3200 years, and a global warming potential (100-year horizon) of 23,900 times that of C02. SF6 use therefore is tightly controlled and regulated. Manufacturing defects within a GIS may lead to leakage of SF6, impacting the environment and at the same time reducing the insulating performance of the GIS. Too much lost insulating gas may have a potentially catastrophic effect due to uncontrolled electric discharges.

For avoiding such problems, art gas monitoring systems for gas insulated switchgear have been developed for typically monitoring density and/or pressure of the system. A leakage rate is calculated based on these measurements. To increase accuracy of this leakage rate calculation, the system may consider measurements and/or data points of for example the last four weeks. If a gas handling operation occurs or if a load changes, in particular for gas compartments in voltage transformers, an immediate change of an originally measured gas pressure and/or density is the consequence. Such very fast change of the pressure can lead to wrongly calculated leakage rates causing unwanted alarms and warnings, which is not convenient for a continuous operation of the GIS.

SUMMARY

It is therefore an object of the disclosure to provide an improved gas monitoring system and a respective method for preventing such 'false alarms'.

The object of the disclosure is solved by the features of the independent claims. Additional implementations are detailed in the dependent claims.

Thus, the object is solved by a gas monitoring system comprising
  a gas-insulated switchgear comprising a chamber filled with an insulating gas surrounding a high or medium voltage component,
  a sensor operatively connected to the chamber and adapted to measure a physical property of the insulating gas in the respective chamber over time, and
  a computer unit adapted to perform on the sensor measurements a statistical step detection for determining if a jump has occurred and/or a statistical change detection for determining if a change has occurred.

A key point of the proposed solution is therefore to automatically detect a gas handling or another sudden change of the physical property, such as for example a change of a pressure and/or density value of the insulating gas. In such case it can be subsequently decided, as described below, if a leakage rate calculation is restarted or if the jump and/or change constitutes a 'false-positive' that can be removed from measurement data, for example in case of a voltage transformer as high or medium voltage component. Such way unwanted alarms and warnings are significantly reduced or even eliminated.

Thus, opposite to prior art systems, it is not necessarily required to in particular manually restart a leakage rate and/or trend calculation algorithm, such as for example HAPG and competition, after a gas handling operation, such as for example a refill of the insulating gas. A similar issue can occur in gas compartments of voltage transformers, where gas pressure and/or density strongly depends on a load of the voltage transformer. Thus, if a line with a voltage transformer is switched on or off, the pressure and/or density changes with an important increase and/or decrease i.e. jumps respectively changes. Such jump has a similar effect than a refill and can cause false alarms, which are avoided with the proposed solution in a very convenient manner.

In other words, the proposed solution basically adds a jump and/or change detection to happen in particular before the actual leakage rate and/or trend calculation to follow next. The proposed jump and/or change detection may look at past measurements for identifying if a current measurement constitutes a jump and/or a change. The jump and/or change detection may identify an expected range based on passed measurements and may check if the current in particular latest measurement is outside of an expected range. In particular, the statistical step and/or change detection may comprise identifying an expected range based on past sensor measurements and checking if a current sensor measurement is outside of the expected range. If such case the jump and/or change can be detected and possibly excluded by adding an offset to the measurements, as described below.

In prior art implementation issues with the leakage rate calculation have been observed in real world after jumps due to gas handling as well as in gas compartments of voltage transformers, where pressure and/or density strongly depends on load of the line, in particular on the energization. With the proposed solution, instead of a new data point, a number of latest data points can be used to detect a jump and/or a change. Thereby, a jump and/or step detection threshold can be calculated using past measurements or given by a pre-defined configuration. Usually, for all compartments except voltage transformers a jump up indicates a refill. A jump down indicates a large leakage or removal of gas. Thus, a jump down may should trigger a leakage alarm. For voltage transformers a jump up can be a refill or an energization event. A jump down might be caused by a huge leakage or de-energization. Jumps down due to de-energization should not cause a leakage alarm. The proposed solution provides detection of these pressure drop events in order to award false alarms.

The gas-insulated switchgear, GIS, may be configured for operating in a medium voltage regime of 10 kV to 100 kV and/or in a high voltage regime of 100 kV to 1200 kV. The chamber may be provided gas tight and/or comprises a metal housing encapsulating the medium or high voltage component. The medium or high voltage component is exemplary provided as a circuit-breaker, a fuse, a disconnector etc. Physical properties which are measured may include pressure, density, sound speed, diffraction, etc. There can be single sensor, while it is also possible that multiple sensors are present, which may measure the same or different physical properties. The term over time may mean that the sensor measure continuously, for example over one day, two days or more days. The computer unit can be provided as any computerized means, such as for example a microprocessor.

The statistical step detection, also known as step smoothing, step filtering, shift detection, jump or edge detection, may be understood as a process of finding an abrupt change in a mean level of the measurements. The statistical step detection may be performed when the measurement data arrives, such as by using a so called online algorithm. The statistical change detection may include identifying times when the probability distribution of a stochastic process or time series changes.

According to an implementation, the computer unit is adapted, if a jump and/or a change occurred, to
a) reset a leakage rate calculation of the insulating gas in the chamber or
b) remove the jump and/or change from by applying an offset to the sensor measurements.

Thus, in case a jump and/or change is detected the leakage rate and/or trend calculation can be automatically reset respectively reinitialized. Such case might be limited to jumps and/changes increasing the physical property, as, for example, refills usually do not decrease the physical property such as for example gas pressure. Alternatively, the jump and/all change can be removed from the measurement in cases where the physical property such as for example pressure and/or density depends on for example line load or other parameters, such as for example a gas compartment in a voltage transformer. In such case an offset can be applied which removes the jump and/or the change, in particular before a leakage rate calculation is applied. The offset may equal the value that basically equalizes the jump and/or the change in the measurements. Hence, the leakage rate calculation can be continued without the requirement to reinitialize respectively rest the leakage rate calculation algorithm.

In a further implementation, the computer unit is adapted to
c) decide on either a) or b) depending on, in case a jump is determined, on a height of the jump and/or a direction of the jump and/or on an additional measurement signal indicative to a status of the gas-insulated switch gear.

In particular for implementations comprising gas compartments where b) is possible, such as for example voltage transformers, it is advantageous to decide if option a) or b) should be chosen. The decision can be made based on at least one of the following parameters height of jump, direction of jump, for example, for voltage transformer pressure changes based on energization are alternating, thus, after a jump up, a next jump will be a jump down, additional measured signal which indicates state, such as for example voltage of voltage transformer as analogue or binary value.

In another implementation the computer unit is adapted to
d) calculate a leakage rate of the insulating gas in the chamber.

Such calculation may occur after the decision on a) and b). The calculation of the leakage rate of the insulating gas may include a calculation of a predicted leakage rate for the future. Such a prediction, allows to keep a strict inventory on gases which are either controlled by environmental standards or which are very expensive. Further, the operator of the GIS is able to identify a future time from which onwards the operation of the GIS might become dangerous and the GIS requires servicing. Leakage of the insulating gas such as for example SF6 may impact the environment and at the same time reduces the insulating performance of the GIS. Thus, having too much of the insulating gas lost may result in potentially catastrophic effects due to uncontrolled electric discharges.

According to a further implementation a jump and/or a change is characterized by a measurement that is $\geq 1.5$, 2.0, 2.5, 5.0 or 10.0 of a standard deviation of the measurements of the last one hour, last two hours, last one day or last two days. Alternatively, the standard deviation of the measurements of the last 12 hours, last 18 hours, last 5 days or last 10 days can be considered. Such way a precise measurement rule is defined for deciding if a jump and/or a change has occurred.

In another implementation the statistical change detection comprises sequentially discounting autoregression time series modelling. Such autoregressive model may constitute a time series model to predict a current measurement from the past measurements in a same univariate time series. Besides that other statistical change detection algorithms can be used as known to the person skilled in the art.

According to a further implementation the physical property of the insulating gas is indicative of a density of the insulating gas in the chamber. Such way the sensor may be provided as density measurement sensor.

In a further implementation, the gas-insulated switch gear comprises a voltage transformer. A voltage transformer, VT, also called potential transformer, PT, is commonly understood as a parallel-connected type of instrument transformer. A voltage transformer is usually designed to present a negligible load to a supply being measured and having an accurate voltage ratio and phase relationship to enable accurate secondary connected metering.

Generally, various possibilities exist for the insulating gas. However, according to an implementation the insulating gas is SF6. Sulfur hexafluoride, SF6, is traditionally the insulating gas of choice for high voltage applications. The symmetrical arrangement of the molecule leads to extreme stability and a very high dielectric capability. SF6 has approximately three times the dielectric strength of air at atmospheric pressure. As a result, GIS using SF6 as an insulating gas can be considerably more compact than equipment using air as the insulating medium. Further, SF6 is a "self-healing" dielectric in that it is largely undamaged by breakdown. This makes SF6 highly suitable as an interrupting medium. Besides SF6 other insulating gases are under development as more climate friendly alternatives to SF6, which can be equally used for the proposed solution.

The object is forever solved by a method for detecting a jump and/or a change in a gas-insulated switchgear comprising a chamber filled with an insulating gas surrounding a high or medium voltage component, comprising the steps of:

Measuring a physical property of the insulating gas in the respective chamber over time, and Performing occurred on the sensor measurements a statistical step detection for determining if a jump has occurred and/or a statistical change detection for determining if a change has occurred.

According to an implementation, if a jump and/or a change occurred, the method comprises the step of:
a) Resetting a leakage rate calculation of the insulating gas in the chamber or
b) Removing the jump and/or the change from by applying an offset to the sensor measurements.

In another implementation the method comprises the step of:
c) Deciding on either a) or b) depending on, in case jump is determined, on a height of the jump and/or a direction of the jump and/or on an additional measurement signal indicative to a status of the gas-insulated switch gear.

According to a further implementation the method comprises the step of:
d) Calculating a leakage rate of the insulating gas in the chamber.

In another implementation a jump and/or a change is characterized by a measurement that is ≥1.5, 2.0 or 2.5 of a standard deviation of the measurements of the last one hour, last two hours, last one day or last two days.

According to a further implementation the statistical change detection comprises sequentially discounting autoregression time series modelling.

In another implementation the physical property of the insulating gas is indicative of a density of the insulating gas in the chamber.

Further implementations and advantages of the method are directly and unambiguously derived by the person skilled in the art from the system as described before.

BRIEF DESCRIPTION OF DRAWINGS

These and other aspects of the disclosure will be apparent from and elucidated with reference to the implementations described hereinafter.

In the drawings:

FIG. 1 shows a gas monitoring system according to an exemplary implementation in a schematic view.

DESCRIPTION OF IMPLEMENTATIONS

FIG. 1 shows a gas monitoring system according to an exemplary implementation in an somatic view.

The gas monitoring system comprises a gas-insulated switchgear 1, a sensor 2 and a computer unit 3. The gas-insulated switchgear 1 comprises a tube-like gas-tight chamber 4, which is filled with an insulating gas 5 surrounding a high or medium voltage component 6. The insulating gas 5 is provided as Sulfur hexafluoride, SF6, while other insulating gases having similar interrupting capabilities can be used as well.

The high or medium voltage component 6 is provided as voltage transformer. The sensor 2 is provided as pressure sensor and operatively connected to the chamber 4 for measuring pressure as physical property of the insulating gas 5 in the chamber 4 over time. While FIG. 1 shows only one chamber 4, the gas-insulated switchgear 1 may comprise three or more chambers 4, one for each phase, and each filled with the insulating gas 5 each surrounding a high or medium voltage component 6 and each equipped with a respective sensor 2.

The computer unit 3 comprises a microprocessor or similar computing means and is configured to perform on the sensor measurements a statistical step detection for determining if a jump has occurred and/or a statistical change detection for determining if a change has occurred. Thereby, the computer unit 3 determines that a jump and/or a change has occurred if a recent measurement is ≥1.5, 2.0 or 2.5 of a standard deviation of the measurements of the last one hour, last two hours, last one day or last two days.

In such case the computer unit 3 decides if a) an already ongoing leakage rate calculation of the insulating gas 5 in the chamber 4 is reset respectively re-initialized or b) if the detected jump and/or change is removed by applying a respective offset to the sensor measurements, and subsequently continuing with the leakage rate calculation. Thus, in the latter case the offset is applied before leakage rate calculation is performed in order to neutralize the jump and/the change.

Step b) is possible for gas compartments comprising a voltage transformer so that the decision can be made on one of a height of the jump and/or the change, on a direction of the jump and/or the change, for example for voltage transformer pressure changes based on energization are alternating, where, after a jump up, a next jump will be a jump down, or on an additional measured signal which indicates a state, such for example a voltage of the voltage transformer as analogue or binary value.

Once the offset is applied, the leakage rate of the insulating gas 5 in the chamber 4 can be continuously calculated. A size of the offset is chosen so as to equalize the jump and/or the change in the measurement data. The statistical step detection for determining if a jump has occurred and/or the statistical change detection for determining if a change has occurred may comprise sequentially discounting autoregression time series modelling.

While the disclosure has been illustrated and described in detail in the drawings and foregoing description, such illustration and description are to be considered illustrative or exemplary and not restrictive; the embodiments are not limited to the disclosed implementations. Other variations to be disclosed implementations can be understood and effected by those skilled in the art in practicing the disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these mea-

REFERENCE SIGNS LIST 1 gas-insulated switchgear
2 sensor
3 computer unit
4 chamber
5 insulating gas
6 medium voltage component

The invention claimed is:

1. A gas monitoring system comprising:
a gas-insulated switchgear comprising a chamber filled with an insulating gas surrounding a high or medium voltage component,
a sensor operatively connected to the chamber and adapted to measure a physical property of the insulating gas in the chamber over time, and
a computer unit adapted to:
perform on the sensor measurements a statistical step detection for determining if a jump has occurred and/or a statistical change detection for determining if a change has occurred, the statistical step and/or change detection comprising identifying an expected range based on past sensor measurements and checking if a current sensor measurement is outside of the expected range, and
in response to a determination that a jump and/or a change occurred:
reset a leakage rate calculation of the insulating gas in the chamber or
remove the jump and/or change by applying an offset to the sensor measurements.

2. The gas monitoring system according to claim 1, whereby the computer unit is adapted to:
decide on either of resetting the leakage rate calculation or removing the jump and/or change depending on, in case jump is determined, on a height of the jump and/or a direction of the jump and/or on an additional measurement signal indicative to a status of the gas-insulated switchgear, and/or whereby
the computer unit is adapted to:
calculate a leakage rate of the insulating gas in the chamber.

3. The gas monitoring system according to claim 1, whereby a jump and/or a change is characterized by a measurement that is ≥1.5, 2.0 or 2.5 of a standard deviation of the measurements of the last one hour, last two hours, last one day or last two days.

4. The gas monitoring system according to claim 1, whereby the statistical change detection comprises sequentially discounting autoregression time series modelling.

5. The gas monitoring system according to claim 1, whereby the physical property of the insulating gas is indicative of a density of the insulating gas in the chamber.

6. The gas monitoring system according to claim 1, whereby the gas-insulated switchgear comprises a voltage transformer.

7. The gas monitoring system according to claim 1, whereby the insulating gas is SF6.

8. A method for detecting a jump and/or a change in a gas-insulated switchgear comprising a chamber filled with an insulating gas surrounding a high or medium voltage component, comprising:
Measuring, by a sensor, a physical property of the insulating gas in the respective chamber over time, and
Performing on the sensor measurements a statistical step detection for determining if a jump has occurred and/or a statistical change detection for determining if a change has occurred, whereby
the statistical step and/or change detection comprises identifying an expected range based on past sensor measurements and checking if a current sensor measurement is outside of the expected range.

9. The method according to claim 8, whereby, if a jump and/or a change occurred, the method comprises:
Resetting a leakage rate calculation of the insulating gas in the chamber or
Removing the jump and/or change by applying an offset to the sensor measurements.

10. The method according to claim 9, whereby the method comprises:
Deciding on either of resetting the leakage rate calculation or removing the jump and/or change depending on, in case jump is determined, on a height of the jump and/or a direction of the jump and/or on an additional measurement signal indicative to a status of the gas-insulated switchgear.

11. The method according to claim 8, the method comprises:
Calculating a leakage rate of the insulating gas in the chamber.

12. The method according to claim 8, whereby a jump and/or a change is characterized by a measurement that is ≥1.5, 2.0 or 2.5 of a standard deviation of the measurements of the last one hour, last two hours, last one day or last two days.

13. The method according to claim 8, whereby the statistical change detection comprises sequentially discounting autoregression time series modelling.

14. The method according to claim 8, whereby the physical property of the insulating gas is indicative of a density of the insulating gas in the chamber.

15. A gas monitoring system comprising:
a gas-insulated switchgear comprising a chamber filled with an insulating gas surrounding a high or medium voltage component,
a sensor operatively connected to the chamber and configured to generate a plurality of measurements of a physical property of the insulating gas in the chamber at a plurality of times, and
a microprocessor configured to:
perform, on the plurality of sensor measurements, a detection operation comprising at least one of a statistical step detection for determining whether a jump has occurred and a statistical change detection for determining whether a change has occurred, the detection operation comprising identifying an expected range based on a subset of the plurality of sensor measurements and determining whether a current sensor measurement of the plurality of sensor measurements is outside of the expected range, and
in response to a determination that a jump and/or a change occurred:
reset a leakage rate calculation of the insulating gas in the chamber or
remove the jump and/or change by applying an offset to the plurality of sensor measurements.

16. The gas monitoring system according to claim 15, whereby the microprocessor is further configured to:
determine whether to reset the leakage rate calculation or remove the jump and/or change based on, in response to a determination that a jump has occurred, a height of the jump and/or a direction of the jump and/or on an additional measurement signal indicative to a status of the gas-insulated switch gear.

17. The gas monitoring system according to claim 15, whereby the microprocessor is further configured to calculate a leakage rate of the insulating gas in the chamber.

18. The gas monitoring system according to claim 15, wherein a jump and/or a change is determined based on a measurement that is ≥1.5, 2.0 or 2.5 of a standard deviation of the measurements of a previous predetermined time period.

19. The gas monitoring system according to claim 1, whereby the statistical change detection comprises sequentially discounting autoregression time series modelling.

20. The gas monitoring system according to claim 1, whereby the physical property of the insulating gas is indicative of a density of the insulating gas in the chamber.

* * * * *